Oct. 17, 1967     L. W. FLECKENSTEIN ET AL     3,347,556
SEALING RING FOR PISTON AND CYLINDER ASSEMBLIES
Filed Feb. 24, 1965     2 Sheets-Sheet 2
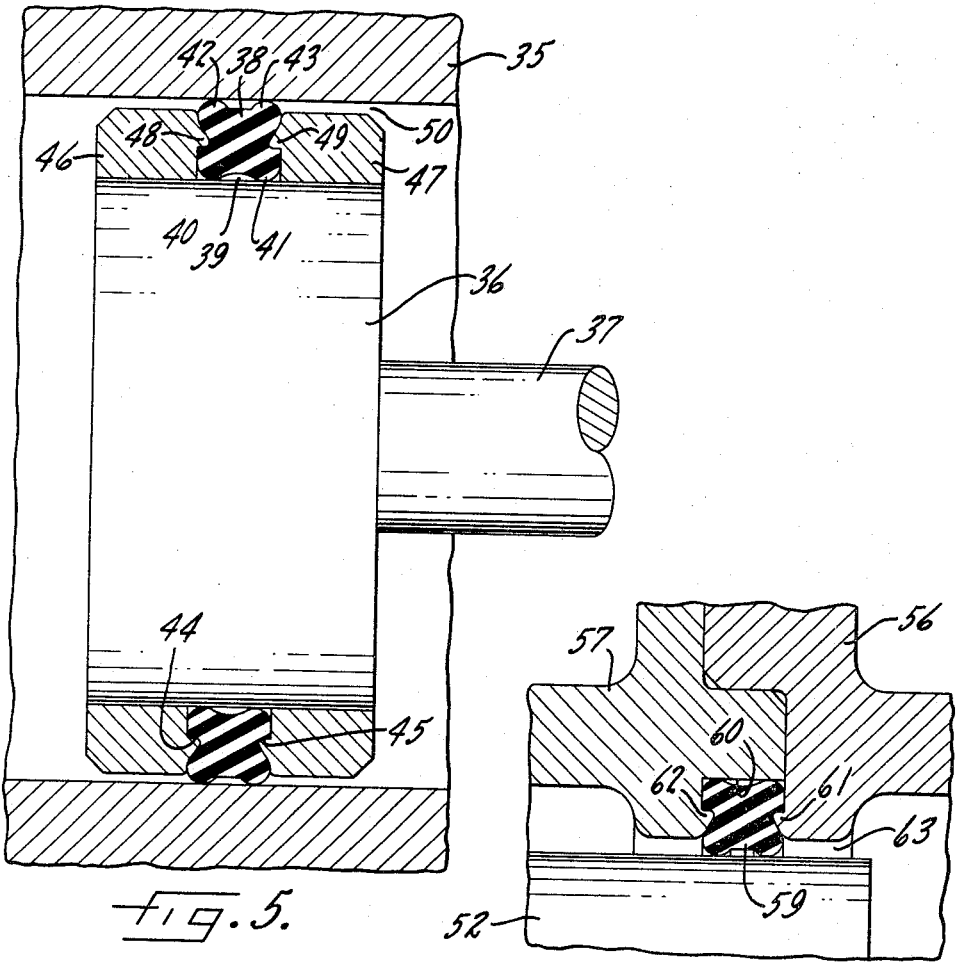
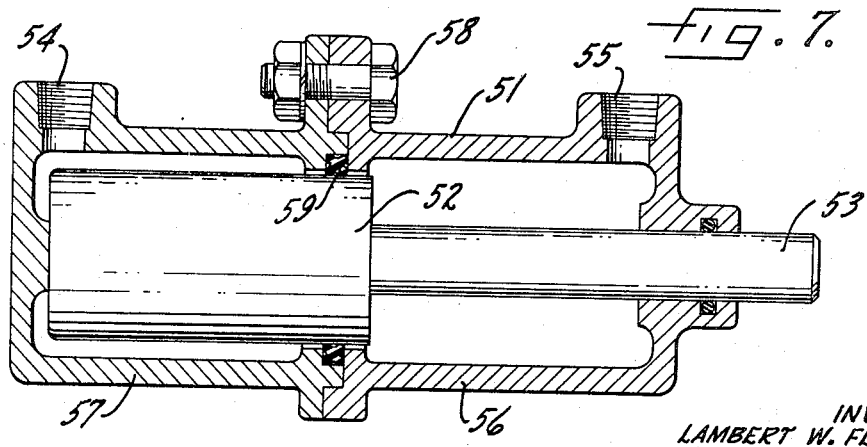
INVENTORS.
LAMBERT W. FLECKENSTEIN
ANDREW J. FLECKENSTEIN
BY
Malcolm S. Bradway
ATTORNEY.

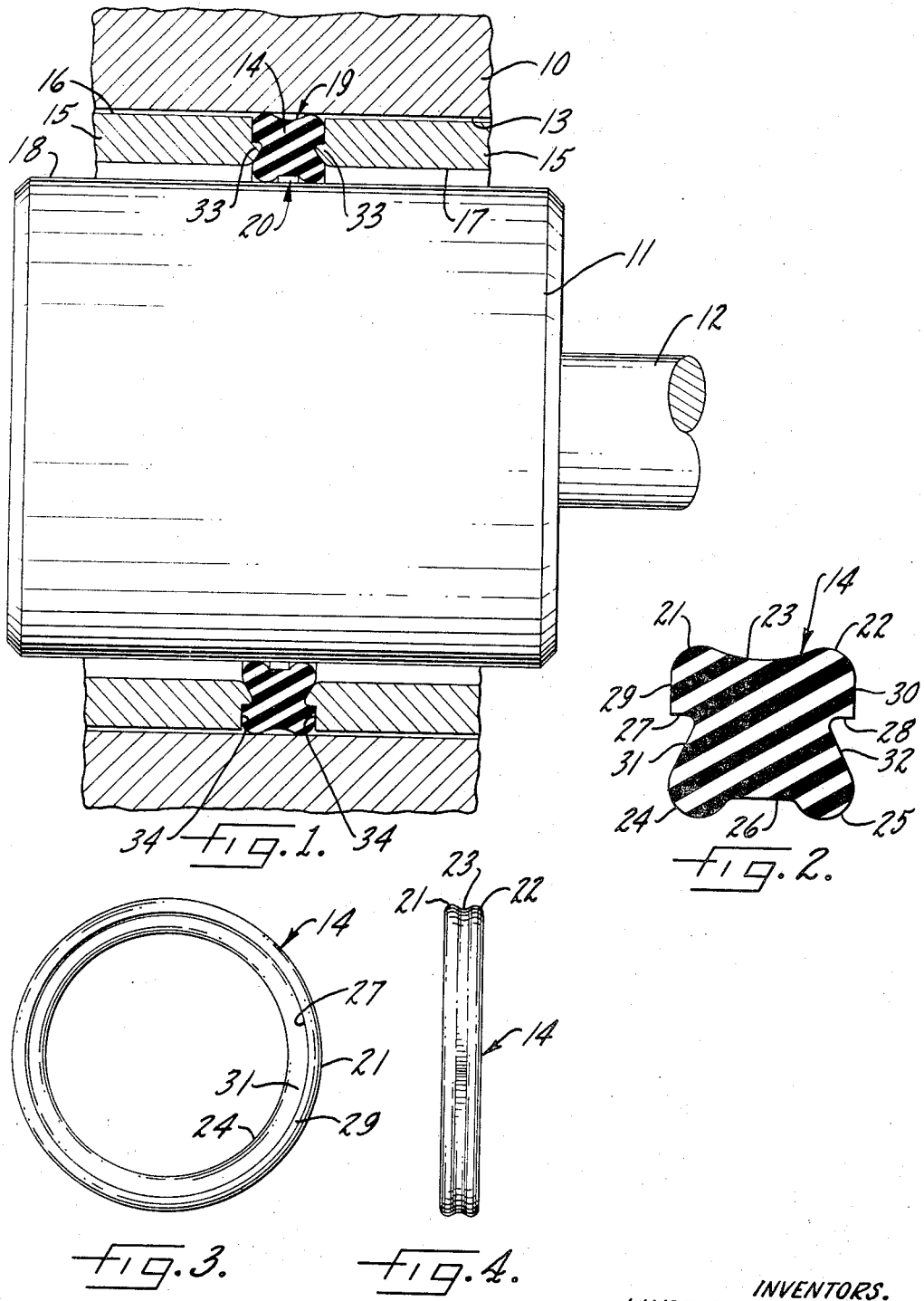

United States Patent Office 3,347,556
Patented Oct. 17, 1967

3,347,556
SEALING RING FOR PISTON AND CYLINDER ASSEMBLIES
Lambert W. Fleckenstein, 4445 N. 135th, and Andrew J. Fleckenstein, 13650 Squirrel Drive, both of Brookfield, Wis. 53005
Filed Feb. 24, 1965, Ser. No. 434,894
2 Claims. (Cl. 277—206)

ABSTRACT OF THE DISCLOSURE

A resilient sealing ring of plural lobe type which is particularly formed with flat inwardly extending captivating surfaces at the sides of the ring.

---

The present invention is directed to new and useful improvements in seals for piston and cylinder assemblies of the general type disclosed in our co-pending applications Nos. 302,660 and 302,669 filed on Aug. 16, 1963.

In sealing assemblies of this general class, one or more resilient seal rings are carried by one of the members of the piston and cylinder assembly while in slideable engagement with the other member. As more particularly described in those aforesaid applications, a clearance space exists between the piston and the wall of the cylinder bore, which space is somewhat larger than the customary clearances employed with piston and cylinder valves or actuators. The rings are characterized by a plurality of lobes which extend outwardly from and inwardly of the body of the rings so that plural lobes engage the wall of the cylinder and also engage the confronting wall of the piston. Separate compression exerting members engage the rings on opposite sides thereof so as to hold them in position. The clearance space is sufficiently large that the lobes in slideable engagement with one member overlie and may be pressed against the exposed wall of the compression members in the assembled, operable position. Prior sealing rings of this type are satisfactory for many applications, particularly water softener valves. However, when resilient seal rings of the aforesaid lobe type are assembled as aforesaid and are used with much higher pressures than those encountered in water softener valves, the pressure tends to cause extrusion of the rings and impairment of the seal. Furthermore, when sealing facilities of this type are used with extremely slow moving pistons, as for example those moving at a rate of movement of several inches per minute, the frictional forces involved tend to twist, distort, or extrude the ring from its normal and desired position, which also will impair the seal. At higher operating speeds, the ring breaks away from its frictional engagement with the confronting wall of the piston and cylinder assembly more readily, and in these cases, the problem of extrusion or distortion from the normal position does not exist as long as the pressures are not unduly high.

With the foregoing in mind, the primary objectives of the present invention are to so form a resilient seal ring for a slideable engagement between a piston and cylinder that the seal ring is held securely in place during low operating speeds or at relatively high pressures while effectively dividing the space within the cylinder into separate liquid passages, to so form a resilient seal ring of the class described that the outer and inner peripheries of the ring effectively provide a static seal for engagement with one of the piston and cylinder assembly confronting walls and a dynamic seal for the other wall, all while utilizing simple means for forming the ring and for assembling the ring in its proper sealing position, these and other purposes of the invention being more fully apparent in the course of the ensuing specification and claims when taken with the accompanying drawings, in which:

FIGURE 1 is a diagrammatic sectional illustration of a typical seal ring assembly constituting the present invention and in which the seal ring is carried by the wall of the cylinder;

FIGURE 2 is an enlarged cross-sectional illustration of the seal ring illustrated in FIGURE 1;

FIGURE 3 is a side view of the seal ring illustrated in FIGURES 1 and 2;

FIGURE 4 is an end view of the seal ring illustrated in FIGURES 1, 2 and 3;

FIGURE 5 is a diagrammatic sectional illustration of a seal assembly formed in accordance with the present invention wherein the seal ring is carried by the piston of the piston and cylinder assembly;

FIGURE 6 is a sectional illustration of another form of piston and cylinder sealing assembly utilizing the principles of the present invention; and FIGURE 7 is an enlarged sectional illustration of a portion of the assembly illustrated in FIGURE 6.

Like elements are represented by like characters throughout the specification and drawings.

With specific reference now to the drawings, and in the first instance to FIGURE 1, the numeral 10 represents a cylinder which, as shown, is diagrammatically representative of a valve cylinder having inlet and outlet ports therein or a cylinder of a piston cylinder actuator assembly. A piston 11 with an operating shaft 12 is mounted for linear movement within the cylinder. Suitable actuating means (not shown) are connected with the shaft so as to move the piston to and fro within the cylinder when the piston is used to control flow of fluid through a valve. When the piston and cylinder are used as an actuator, shaft 12 may be interconnected with a power transmitting mechanism. As will be seen in FIGURE 1, the wall 13 defining the bore of the cylinder is considerably larger than the diameter of the piston.

In accordance with the present invention, one or more resilient sealing rings 14 have a generally circular form and are positioned within the bore of the cylinder. Spacing rings 15 are positioned within the bore of the cylinder and serve to hold the sealing rings in position. The spacing rings 15 may have outer diameters 16 conforming relatively closely to the wall 13 defining the bore of the cylinder and may be held in position by compression exerting members which are fixed to the cylinder in the manner described in our copending application Ser. No. 302,669. Thus, the rings 15 exert compressive forces on the seal rings 14. The inner circumferential walls of the rings 15 may have considerable tolerances with the opposed wall of the piston as designated at 17 and 18, thereby leaving a considerable clearance space between these confronting walls.

In accordance with the present invention, the piston is held in its proper axially movable relation by means of bearing means (not shown) other than the wall of the cylinder. The seal ring 14 is effective to provide a static seal generally designated at 19 with the cylinder wall which carries the ring and a dynamic seal generally designated at 20 with the opposed wall of the piston which makes a sliding fit with the ring 14. The seal ring 14 may aid in providing some bearing support for the piston 11 as it travels to and fro within the cylinder.

Ring 14 is so shaped that it provides a spaced pair of curvilinear lobes 21 and 22 on the static sealing side of the ring which, as is shown in FIGURE 1, is the outer periphery of the ring. These curvilinear surfaces defining the spaced lobes may be joined by an outwardly concave surface portion 23. A pair of spaced lobes of curvilinear cross section are shown at 24 and 25, which lobes are adapted for engagement with the piston on the inner periphery of the rings. The lobes 24 and 25 are joined by an intermediate surface 26 which preferably extends parallel to the axis of the piston and cylinder. The lobes 24 and 25 should have a sufficient curvature with relation to the resiliency of the ring that they are capable of deformation toward and away from the axis of the piston and cylinder under working conditions. An elastomeric material equivalent to approximately 60 to 70 durometer rubber is satisfactory for the ring.

The ring body is further characterized by abutment surfaces 27 and 28 positioned intermediate the inner and outer pairs of lobes at the sides of the ring and which, as shown, extend generally parallel to the axis of the piston and cylinder. The abutment surfaces 27 and 28 are joined with the static lobe portions through side surfaces 29 and 30, respectively, which extend generally transversely to the axis of the piston and cylinder and by surfaces 31 and 32 which extend generally transversely to the axis of the piston and cylinder which merge with the curvilinear surfaces defining the dynamic sealing lobes 24 and 25. The surfaces 31 and 32 may be formed as short arcs if desired. The spaced pair of static sealing lobes 21 and 22 and the spaced pair of dynamic sealing lobes 24 and 25 are of similar cross section to that illustrated in FIGURE 2 throughout the periphrey of the seal ring, as may be appreciated in FIGURE 3 and FIGURE 4.

The compression exerting rings 15 have projections 33 which match the shape of the recesses defined by the abutment surfaces 27, 28, 31 and 32 and other surfaces 34 which match the side surfaces 29 and 30 as is seen in FIGURE 1.

When the seal rings 14 are positioned with the cylinder, the spacer rings are positioned as illustrated. The dynamic lobes thus overlie the spacer or compression exerting rings 15. When more than one seal ring is employed along the length of the cylinder, as in a valve, the opposite ends of the spacing rings 15 are similarly formed so as to properly fit with the side surfaces of a plurality of spaced seal rings. When the seal ring is positioned and the compression exerting spacing members 15 are assembled therewith in a press-fitting relation, the spacing rings tend to deform the outer side of the ring so as to provide a relatively tight fit at the static sealing side 19 of the ring. At the same time, the surfaces 33 of the spacing rings exert compressive forces on the dynamic sealing lobes 24 and 25 and tend to press them toward one another and thus tend to press them inwardly toward the axis of the cylinder and piston.

When the piston 11 is positioned in its assembled relation as illustrated in FIGURE 1, the dynamic sealing lobes 24 and 25 make a tight fit with the confronting wall of the piston. The fit with the piston is sufficiently tight that the piston causes some deformation of the lobes 24 and 25 away from one another. Pressure forces on opposite sides of the ring tend to move the lobes 24 and 25 toward one another and inwardly toward the axis of the piston and cylinder, thus tightening the seal. Distortion of the ring from its normal position illustrated in FIGURE 1 is precluded by the holding action of the abutment surfaces 27 and 28 which bear against the matching surfaces of the projections 33, thus precluding twisting of the body due to unbalanced pressure forces on opposite sides of the ring or due to frictional forces between the dynamic sealing lobes 24 and 25 and the wall of the piston.

FIGURE 5 illustrates a variant form of the invention wherein the cylinder is designated at 35 and the piston is designated at 36. The piston rod is designated at 37. In FIGURE 5, the piston 36 carries the real ring 38. The seal ring 38 is identical to the seal ring of FIGURES 1, 2, 3 and 4 with the exception that the static seal 39 is defined by the inner static sealing lobes 40 and 41 which engage the wall of the piston while the outer dynamic sealing lobes 42 and 43 engage the wall of the cylinder. The cross-sectional configuration of the ring is identical to that of FIGURES 1, 2, 3 and 4 with the exception that the surfaces are inverted while still providing the characteristic abutment surfaces 44 and 45 extending generally parallel to the axis of the piston and cylinder.

Spacing and compression exerting rings 46 and 47 are carried by the wall of the piston and have projections 48 and 49 matching the recesses at the sides of the ring so as to hold the ring in position, exert pressure on the lobes and preclude twisting of the ring body. The spacer rings 46 and 47 may be press-fitted on the piston or may be held thereon in a screw threaded relation (not shown). In FIGURE 5, as is true in FIGURE 1, a considerable clearance 50 exists between the spacer rings and the confronting wall on the dynamic sealing side of the assembly. The piston is maintained in it proper linearly movable relation through external bearing means although some bearing support may be afforded by the rings 38.

FIGURES 6 and 7 illustrate a variant form of holding the ring in position. In FIGURES 6 and 7, a piston and cylinder actuator is illustrated as by the cylinder 51 and the piston 52 which carries the customary piston rod 53. The cylinder may have inlet and outlet ports 54 and 55 at the opposite ends thereof for the admission of fluid to and from the ends of the cylinder so as to move the piston to and fro within the cylinder. In FIGURES 6 and 7, the cylinder is sectionally formed as by the sections 56 and 57 which are held in the proper relation by bolts and nuts 58 positioned around the circumference of the assembly. A seal ring 59 identical to the seal ring 14 of FIGURE 1 is held captive in the position illustrated in FIGURE 7 by the two sectional portions 56 and 57. These portions are so formed that a ring receiving recess 60 is defined at the joint of the two sections while the two sections provide projections 61 and 62 for a matching engagement with the abutment surfaces and the side surfaces of the ring so as to compress the ring as in FIGURE 1 and hold it captive in position, while precluding twisting thereof. The ring may have a cross section which is slightly larger than the recess 60 so that when the nut and bolt assemblies 58 are tightened up, the body of the ring may be deformed by the cavity defining portions of the members 56 and 57 and thus provide a tight seal on the static side of the ring. As is true in FIGURE 1, a considerable clearance space 63 may exist between the piston 52 and the opposed wall of the cylinder and projections 61 and 62.

Seal rings as herein defined may be used as valve defining lands of a piston and cylinder type of valve as described in our aforementioned copending application or may be used to provide a seal between the piston and cylinder so as to divide the cylinder space on opposite sides of a piston into separate pressure spaces. Through use of rings as herein defined, extremely close tolerances between the confronting walls of the piston and cylinder, as defined with the compression exerting members or rings, may be relatively large leaving considerable clearance between all portions of the piston and cylinder other than at the ring seals, thus lending economy to manufacturing processes. At the same time, the rings are securely held in position and form relatively tight sealing fits both at the static side of the ring where the ring is fixed and at the dynamic, slideable sealing side of the ring.

Whereas we have shown and described an operative form of the invention, it should be understood that this showing and description thereof should be taken in an illustrative or diagrammatic sense only. There are many modifications in and to the invention which will be apparent to those skilled in the art and which will fall within the scope and spirit thereof. The scope of the invention should be limited only by the scope of the hereinafter appended claims.

We claim:
1. A sealing ring including a resilient, circular ring body having inner and outer peripherally extending seal-static sealing surfaces, the dynamic sealing surface being defined by a first pair of spaced lobes on the ring body, said lobes being characterized by spaced curvilinear surfaces with a connecting surface between the curvilinear surfaces to define a concavity, said ring body having flat abutment surfaces on the sides thereof and extending around the periphery of the body, said abutment surfaces extending generally parallel to a central axis of the ring body and facing toward said first pair of spaced lobes, said ring body having curvilinear lobes defining the static sealing surface of said body, said abutment surfaces extending inwardly from the opposite sides of said body, said body having surfaces connecting said abutment surfaces with said first pair of lobes and extending inwardly from said first pair of lobes in a direction inclined to the general plane of the entire ring body from the sides of said body to define recesses on the opposite sides of said body.

2. The structure of claim 1 wherein said ring body has essentially flat surfaces extending generally transversely to said abutment surfaces and connecting said last named curvilinear lobes with said abutment surfaces.

References Cited
UNITED STATES PATENTS

| | | | |
|---|---|---|---|
| 2,392,182 | 1/1946 | Payne | 277—206.1 |
| 3,215,441 | 11/1965 | Horvereid | 277—205 X |
| 3,228,705 | 1/1966 | Underwood | 277—206 |

SAMUEL ROTHBERG, *Primary Examiner.*

UNITED STATES PATENT OFFICE
CERTIFICATE OF CORRECTION

Patent No. 3,347,556                        October 17, 1967

Lambert W. Fleckenstein et al.

It is hereby certified that error appears in the above numbered patent requiring correction and that the said Letters Patent should read as corrected below.

Column 5, line 4, before "static" insert -- ing surfaces providing radially spaced dynamic and --.

Signed and sealed this 12th day of November 1968.

(SEAL)
Attest:

Edward M. Fletcher, Jr.                        EDWARD J. BRENNER
Attesting Officer                              Commissioner of Patents